(Model.)
W. V. R. & D. F. BLIGHTON.
NUT AND LOCK FOR THE SAME.
No. 275,570. Patented Apr. 10, 1883.
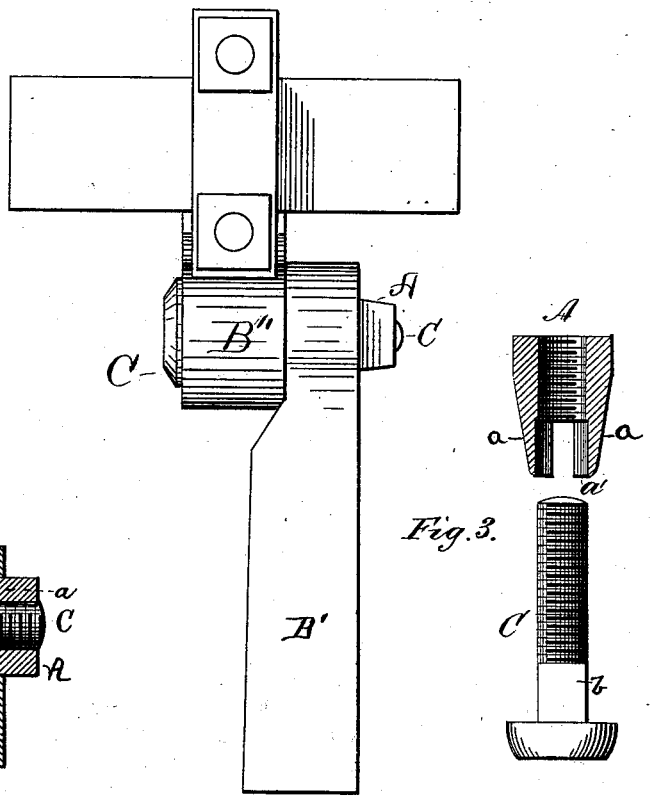
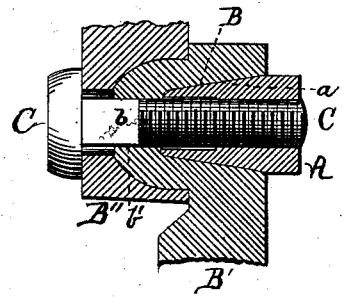
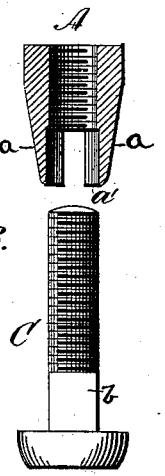
Witnesses:
T. H. Parsons
J. R. Drake
W. V. R. Blighton &
D. Franklin Blighton
Inventors by
J. R. Drake,
Atty.

UNITED STATES PATENT OFFICE.

WILLIAM V. R. BLIGHTON AND D. FRANKLIN BLIGHTON, OF TONAWANDA, NEW YORK.

NUT AND LOCK FOR THE SAME.

SPECIFICATION forming part of Letters Patent No. 275,570, dated April 10, 1883.

Application filed February 13, 1883. (Model.)

*To all whom it may concern:*

Be it known that we, WM. V. R. BLIGHTON and D. FRANKLIN BLIGHTON, citizens of the United States, residing at Tonawanda, in the county of Niagara and State of New York, have invented certain and useful Improvements in Nuts for Machinery, Carriages, Thill-Couplings, &c., and Locks for the same, of which the following is a specification, reference being had therein to the accompanying drawings, in which—

Figure 1 is a bottom plan view of our device in connection with the clip and part of the axle of a vehicle. Fig. 2 is a sectional view of the parts to be united by the bolt and the nut, with the bolt in place. Fig. 3 is a detail showing the bolt and a section of the nut.

A represents the nut, made square at the top, and having rounded, elongated, and tapering sides $a$, constructed to set into the correspondingly-tapering seat B in the part B', which fits upon or into the other part, B'', to be united. The conical or tapering sides $a$ of the nut are split up a little ways on opposite sides, or three or more splits, $a'$, may be made, if desired. These are to allow for compression against the sides of the seat B and against the bolt C when the nut A is screwed onto the bolt, and the ends $a$ projecting into the tapering seat B. The nut is threaded in the square head, as usual, and a little below; but the lower part of the tapering ends are left unthreaded, so as to compress more easily against the bolt-threads, the tension against the bolt and the friction of the seat on the outside of the nut making a very strong lock. In addition to this, and to prevent the bolt turning when in place, we make a square head, $b$, to the bolt C, and in the end of the seat B make a corresponding square opening, $b'$, (see Fig. 2,) in which the square head $b$ sets, the usual round head of the bolt being above, as shown. The friction of the tapering nut and seat and the square head of the bolt in its seat make it impossible for the parts to work loose.

This device is applicable to various purposes as a nut and lock; but it is more particularly intended as a non-rattling thill-coupling and one that cannot work loose.

We are acquainted with a short nut with a beveled end, and split clear through on one side and setting into a countersunk washer, and all fitting on an inversely-tapering screw. Such we do not claim. We use only a common screw-bolt, adding merely a square head to it, and the nut has an elongated tapering end and split a short way only in the unthreaded end, and we make a correspondingly long conical seat for said nut in whatever device we apply it to.

We claim—

1. The nut A, having the elongated and split tapering extension end $a$, the nut being threaded and the extension ends unthreaded, and in combination with a seat, B, formed in one of the parts to be united, made correspondingly tapering to receive the tapering end $a$ of the nut, and by friction hold the nut and bolt C therein, substantially as specified.

2. In combination with the tapering nut A $a$, the tapering seat B, in one part, as B', having a square opening, $b'$, at the small end, and the bolt C, provided with a square head, $b$, to set therein to prevent turning, all substantially as specified.

In testimony whereof we affix our signatures in presence of two witnesses.

W. V. R. BLIGHTON.
    D. FRANKLIN BLIGHTON.

Witnesses:
    EDWARD M. BROWN,
    J. J. WHITTEMORE.